(12) United States Patent
Geyer et al.

(10) Patent No.: US 10,707,781 B2
(45) Date of Patent: Jul. 7, 2020

(54) POWER CONVERTER OPERATION USING A MODEL PREDICTIVE CONTROLLER

(71) Applicant: ABB Schweiz AG, Baden (CH)

(72) Inventors: Tobias Geyer, Baden (CH); Petros Karamanakos, Tampere (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/212,752

(22) Filed: Dec. 7, 2018

(65) Prior Publication Data
US 2019/0181775 A1    Jun. 13, 2019

(30) Foreign Application Priority Data

Dec. 7, 2017  (EP) ..................................... 17205874

(51) Int. Cl.
*H02M 7/5387*  (2007.01)
*H02M 1/00*    (2006.01)
(Continued)

(52) U.S. Cl.
CPC ....... *H02M 7/53875* (2013.01); *H02M 1/126* (2013.01); *H02M 1/14* (2013.01);
(Continued)

(58) Field of Classification Search
CPC . H02M 2001/0003; H02M 2001/0006; H02M 2001/0012; H02M 2001/0025;
(Continued)

(56) References Cited

U.S. PATENT DOCUMENTS

| 2008/0143562 A1* | 6/2008 | Huang | H04L 27/364 |
|---|---|---|---|
|  |  |  | 341/118 |
| 2012/0161685 A1* | 6/2012 | Geyer | H02M 1/12 |
|  |  |  | 318/503 |

(Continued)

FOREIGN PATENT DOCUMENTS

| WO | 2015055444 A1 | 4/2015 |
|---|---|---|
| WO | 2016134874 A1 | 9/2016 |

OTHER PUBLICATIONS

European Patent Office, Extended Search Report issued in corresponding Application No. 17205874.5, dated Jun. 6, 2018, 7 pp.

(Continued)

*Primary Examiner* — Nguyen Tran
*Assistant Examiner* — David A. Singh
(74) *Attorney, Agent, or Firm* — J. Bruce Schelkopf; Taft Stettinius & Hollister LLP (57) ABSTRACT

Systems, methods, techniques and apparatuses of power converters are disclosed. One exemplary embodiment is a method of controlling and modulating a converter with a controller including forming a mathematical representation of the electrical system including the converter, providing reference values for controlled variables, calculating gradients of controlled variables based on the mathematical representation of the electrical system, determining possible switching sequences in the modulation period, the switching sequence defining the order in which the switches are switched, for each possible switching sequence, minimizing the error between the provided references and the corresponding controlled variables based on the calculated gradients by optimizing the switching time instants of the switching sequence, selecting the switching sequence with the smallest error, and applying the switching sequence with (Continued)

the corresponding switching times in the modulation period to modulate the controllable switches.

20 Claims, 7 Drawing Sheets

(51) Int. Cl.
- H02P 27/08 (2006.01)
- H02M 1/12 (2006.01)
- H02P 23/14 (2006.01)
- H02M 7/5395 (2006.01)
- H02M 1/14 (2006.01)
- H02M 7/483 (2007.01)

(52) U.S. Cl.
CPC ..... *H02M 7/5395* (2013.01); *H02M 7/53871* (2013.01); *H02P 23/14* (2013.01); *H02M 2001/0012* (2013.01); *H02M 2001/0025* (2013.01); *H02M 2007/4835* (2013.01); *H02M 2007/53876* (2013.01); *H02P 27/08* (2013.01)

(58) Field of Classification Search
CPC ........ H02M 1/08; H02M 1/084; H02M 1/126; H02M 1/14; H02M 7/53875; H02M 2007/53876; H02P 27/08
See application file for complete search history.

(56) References Cited

U.S. PATENT DOCUMENTS

| | | | | |
|---|---|---|---|---|
| 2012/0314466 A1* | 12/2012 | Goerges | ............ | H02M 7/53873 363/78 |
| 2013/0106107 A1* | 5/2013 | Spruce | ................ | F03D 7/0224 290/44 |
| 2014/0067738 A1* | 3/2014 | Kingsbury | ............... | G06N 3/08 706/20 |
| 2014/0350743 A1* | 11/2014 | Asghari | ............... | G05B 13/048 700/297 |
| 2015/0131342 A1* | 5/2015 | Larsson | .................... | H02J 3/36 363/35 |
| 2015/0171726 A1* | 6/2015 | Singh Riar | ........... | H02M 7/487 363/65 |
| 2015/0171769 A1* | 6/2015 | Geyer | ................... | H02M 7/483 363/71 |
| 2015/0229233 A1* | 8/2015 | Quevedo | ................. | H02P 27/12 318/812 |
| 2015/0249381 A1* | 9/2015 | Zanarini | ................. | H02M 1/08 363/78 |
| 2016/0087567 A1* | 3/2016 | Thomas | .............. | H02P 21/0025 318/767 |
| 2016/0142003 A1* | 5/2016 | Scotson | ............. | H02P 29/0243 |
| 2016/0226368 A1* | 8/2016 | Al-Hokayem | ........ | H02M 1/126 |
| 2016/0276919 A1* | 9/2016 | Geyer | ..................... | H02M 1/08 |
| 2016/0329714 A1* | 11/2016 | Li | ........................... | H02M 7/44 |
| 2017/0133845 A1* | 5/2017 | Geyer | .............. | H02M 7/53873 |

OTHER PUBLICATIONS

Karamanakos et al., "Computationally Efficient Long-Horizon Direct Model Predictive Control for Transient Operation," 2017 IEEE Energy Conversion Congress and Exposition (ECCE), Oct. 1, 2017, pp. 4642-4649.

Razi et al., "Multi-loop control of stand-alone inverters with minimum number of sensors," IET Power Electronics, vol. 9, No. 12, 2016, pp. 2425-2433.

European Patent Office, Examination Report in corresponding application No. 17205874.5, dated Apr. 17, 2020, 5 pp.

S. A. Larrinaga et al., "Predictive Control Strategy for DC/AC Converters Based on Direct Power Control," IEEE Transactions on Industrial Electronics, dated Jun. 2007, pp. 1261-1271, vol. 54, No. 3, IEEE, Piscataway, US.

S. Vazquez et al., "Predictive Optimal Switching Sequence Direct Power Control for Grid-Connected Power Converters," IEEE Transactions on Industrial Electronics, dated Apr. 2015, pp. 2010-2020, vol. 62, No. 4, IEEE, Piscataway, US.

* cited by examiner

| Phases to switch | | |
|---|---|---|
| First | Second | Third |
| $a$ | $b$ | $c$ |
| $a$ | $c$ | $b$ |
| $b$ | $a$ | $c$ |
| $b$ | $c$ | $a$ |
| $c$ | $a$ | $b$ |
| $c$ | $b$ | $a$ |

POWER CONVERTER OPERATION USING A MODEL PREDICTIVE CONTROLLER

FIELD OF THE INVENTION

The invention relates to control and modulation of a converter, and particularly to direct model predictive control (MPC) of a converter.

BACKGROUND OF THE INVENTION

Figure 1:
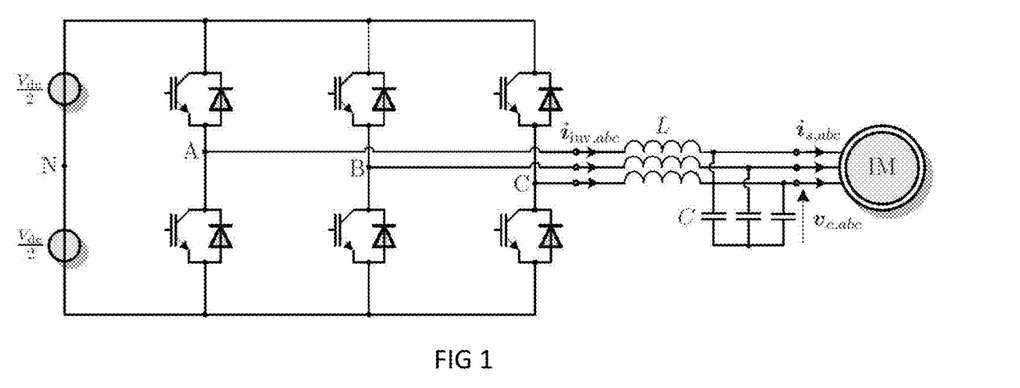
FIG. 1 shows a two-level three-phase voltage source inverter with an output LC filter driving an induction motor.

Converters are widely used in controlling electrical loads. Converters may be employed in feeding electrical power to and from an electrical machine, a load or an AC grid. Typically, the converter is referred to as an inverter when it is used to control a motor or a load, and a (grid-connected) converter when it is used for feeding power to and from an AC grid. An example of a two-level three-phase voltage source inverter with an output LC filter driving an induction motor is provided in FIG. 1.

Typical control problems of power electronic systems include the following. For example, for a converter driving an electrical machine, the stator currents need to be regulated along their reference trajectories. In case of a drive system with an intermediate LC filter (see FIG. 1), also the filter capacitor voltages and the converter currents should be regulated. Moreover, during steady-state operation, transients and faults, the total harmonic distortion (THD) of the load currents should be minimized. This is equivalent to minimizing the root mean squared (rms) current error. Furthermore, for grid-side converters, the harmonic spectra of the grid currents and voltages should meet the relevant grid code. This implies a harmonic spectrum with harmonics at odd non-triplen integer multiples of the fundamental frequency and operation at a constant switching frequency. Typically, amplitudes of higher-order harmonics should be small. Moreover, when an LC filter is employed, the ratio between the switching frequency and the frequency of the LC filter resonance is of prime importance. In order to minimize the size of this filter, the mentioned ratio should be as small as possible. Any ratio below three is considered to be small. Furthermore, in a converter, a fast closed-loop control is required to quickly compensate for changes in the load, such as torque and power steps, as well as for fast rejection of disturbances, such as dc-link voltage ripple.

Considering all the above, it is apparent that a suitable controller should successfully meet all the control objectives, which in many cases compete with each other. Control designers most commonly resort to simplifications of the control problem at hand as well as of the model of the power electronic system. Specifically, given that power electronic systems are nonlinear multiple-input, multiple output (MIMO) systems with constraints on input variables (such as integer constraints or duty cycle constraints), state variables (such as current constraints) and output variables, the MIMO control problem is typically decomposed into multiple single-input, single-output (SISO) loops, which are arranged in a cascaded manner according to the dominant time constant of each loop. Following, to conceal the switching nature of the system, the concept of averaging and pulse width modulation (PWM) is employed. This gives rise to indirect control, which is presented in FIG. 2. Cascaded SISO loops and a PWM stage enable the use of linear controllers, such as conventional proportional-integral-derivative (PID) controllers. Such controllers are typically augmented by additional anti-windup mechanisms and rate limiters. In case of LC filters, the inner (current) control loop is augmented with an active damping loop to dampen the system resonance introduced by the filter.

Although indirect control techniques work well at steady-state operation, during transients and faults, the different control loops are often poorly decoupled, interacting with each other adversely. This implies that the bandwidth of the controller should be reduced in order to avoid stability issues, which, in turn, limits the system performance. Moreover, since controllers of this type are usually tuned to achieve satisfactory performance only in a narrow operating range, when operating at a point outside this range the performance tends to deteriorate significantly. To avoid the latter, gain scheduling is adopted, which further complicates the tuning of the control loops and renders the whole design procedure cumbersome.

Moreover, when MIMO systems like a converter with an LC filter are to be controlled, the controller design should be relatively straightforward. The control of the output variables (such as load currents, capacitor voltages, converter currents, etc.) should be performed in one loop, while additional damping loops that further complicate the design are to be avoided.

As can be understood from the above, a new MIMO control approach is required that tackles all the control objectives in one computational stage.

BRIEF DESCRIPTION OF THE INVENTION

An object of the present invention is to provide a method and an apparatus for implementing the method so as to solve the above problems. The objects of the invention are achieved by a method and an apparatus, which are characterized by what is stated in the independent claims. The preferred embodiments of the invention are disclosed in the dependent claims.

The invention is based on the idea of employing MPC in controlling and modulating a converter. In the disclosed model predictive controller, the switching patterns (i.e., switching sequences and corresponding switching instants) of a converter are calculated in an optimal manner in real time. The switching patterns are optimized on the basis of the error between the reference values of the controlled variables and their predicted values. Controlled variables are typically load currents, converter currents, capacitor voltages, real and reactive powers, electromagnetic torques, fluxes and speeds. In the optimization step, both the switching sequence and the switching instants of the switches are taken into account. As a result, the optimal switching sequence with the corresponding switching instants is selected to be applied to the converter.

In the disclosure, a fixed modulation cycle akin to PWM is used with one switching transition per phase and half-cycle, resulting in a constant switching frequency and a discrete harmonic spectrum. For each of the possible six switching sequences, MPC aims to minimize the rms error of the controlled variables by manipulating the three switching instants. The switching sequence and corresponding switching instants that are predicted to minimize the rms error are chosen as the optimal ones.

The direct MPC method is applicable to the grid-side and the load-side of converter systems. This includes variable speed drive systems with electrical machines and converters with LC filters, see also FIG. 1. The latter system introduces a resonance frequency. The controller of the disclosure can operate such systems even when the ratio between the switching frequency and the resonance frequency is two without any additional damping loop.

BRIEF DESCRIPTION OF THE DRAWINGS

In the following, the invention will be described in greater detail by means of preferred embodiments with reference to the attached [accompanying] drawings, in which

FIG. 4b shows a controlled variable together with a reference value corresponding to FIG. 4a;

FIG. 7b shows the squared error of the deviation of the controlled variable from its reference at the sampling instants, which correspond to FIG. 7a;

DETAILED DESCRIPTION OF THE INVENTION

The mathematical model of the converter system and the formulation of the optimization problem are derived in the stationary orthogonal $\alpha\beta$-frame. The operation $\xi_{\alpha\beta} = K\xi_{abc}$ maps any variable in the abc-plane $\xi_{abc} = [\xi_a\ \xi_b\ \xi_c]^T$ into the two-dimensional vector $\xi_{\alpha\beta} = [\xi_\alpha\ \xi_\beta]^T$ in the $\alpha\beta$-plane via the transformation matrix $$K = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}$$

Hereafter, all variables in the abc-plane are denoted by their corresponding subscript, whereas the subscript is dropped for those in the $\alpha\beta$-plane.

The disclosure relates to the control of the state variables of a power electronic system, such as the voltages, currents and (virtual) fluxes of a converter, filter, load, grid or electrical machine. The plant is assumed to be linear with integer inputs, i.e., its continuous-time state-space representation is of the form $$\frac{dx(t)}{dt} = Dx(t) + EKu_{abc}(t) \tag{1a}$$

$$y(t) = Cx(t), \tag{1b}$$

where $x \in \mathbb{R}^{n_x}$ and $y \in \mathbb{R}^{n_y}$ are the state and output vectors, respectively, and $n_x, n_y \in \mathbb{N}^+$. Moreover, the input vector $u_{abc} = [u_a\ u_b\ u_c]^T \in \mathbb{Z}^3$ is the three-phase switch position. Finally, D, E, and C, are the state, input and output matrices, which characterize the system. The equations which can be used in state-space representation are known as such. Generally, the state-space representation uses mathematical formulas, which describe the behaviour of the system.

Using exact Euler discretization, the discrete-time state-space model of the power electronic system is $$x(k+1) = Ax(k) + BKu_{abc}(k) \tag{2a}$$

$$y(k) = Cx(k) \tag{2b}$$

with $A = e^{DT_s}$ and $B = -D^{-1}(I-A)E$. Moreover, I is the identity matrix, e the matrix exponential, $T_s$ the sampling interval, and $k \in \mathbb{N}$. The sampling interval is equivalent to the modulation (half)interval in asymmetric regularly sampled carrier-based PWM. Therefore, we will refer to $T_s$ also as the modulation period.

Further, the following description focuses on a two-level converter, which features $2^3=8$ possible three-phase switch positions $u_{abc}$. The components of $u_{abc}$ are either 1 or −1. The switch positions refer to the fact that switches in a converter are used in pairs such that a pair of switches is used for connecting an output either to a positive or to a negative supply voltage. Such a pair forms a phase output of the converter. A component of the switch position $u_{abc}$ being 1 implies that the upper switch of the switch pair connects the output of the phase in question to the positive supply voltage. Similarly, −1 denotes the case in which the lower switch connects the negative supply voltage to the output of the phase. The extension to multilevel converters is straightforward, as will be explained below.

In the present invention, one of the objectives is to minimize the ripples of the controlled variables, i.e., the variables of concern, while operating at a constant converter switching frequency. To do so, the converter switches are allowed to change state within the sampling interval $T_s$ rather than only at the discrete time steps k, k+1, . . . . To guarantee equal load distribution among the three phases, each of the three phases switches once within $T_s$.

To achieve the aforementioned control objectives, the objective function takes into account the weighted (squared) rms error of the output variables, i.e., $$J = \frac{1}{T_s}\left(\int_0^{T_s}(y_{ref}(t) - y(t))^T Q(y_{ref}(t) - y(t))dt\right) \tag{3}$$

$$= \frac{1}{T_s}\left(\int_0^{T_s}\|y_{ref}(t) - y(t)\|_Q^2 dt\right)$$

where $y_{ref} \in \mathbb{R}^{n_y}$ is the vector of reference values for the controlled (output) variables. Moreover, $Q \in \mathbb{R}^{n_y \times n_y}$ is a diagonal, positive definite matrix. We write $Q \succ 0$. The entries of Q prioritize the tracking accuracy among the different controlled variables y. Note that owing to the Parseval theorem, minimizing (3) is equivalent to minimizing the squared THD of the variables of concern over the sampling interval.

The switching instants $t_z$, $z \in \{1, 2, 3\}$ occur consecutively within the sampling interval, i.e., we impose $0 < t_1 < t_2 < t_3 < T_s$. Assume that we applied the switch position $u_{abc}(t_0^-)$ at the end of the last sampling interval. At the beginning of the current sampling interval, at $t_0=0$, we have therefore $u_{abc}(t_0) = u_{abc}(t_0^-)$. At time instant $t_1$ we switch from $u_{abc}(t_0)$ to $u_{abc}(t_1)$. Similar statements can be made for the time instants $t_2$ and $t_3$. We define the vector of switching times t and the vector of switch positions (the switching sequence) U as $$t = [t_1 \ t_2 \ t_3]^T \quad (4a)$$

$$U = [u_{abc}^T(t_0) \ u_{abc}^T(t_1) \ u_{abc}^T(t_2) \ u_{abc}^T(t_3)] \quad (4b)$$

Figure 4A:
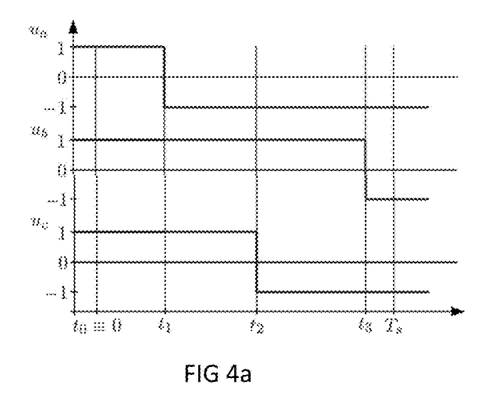
FIG. 4a shows an example of a switching sequence (for a two-level converter)
Figure 4B:
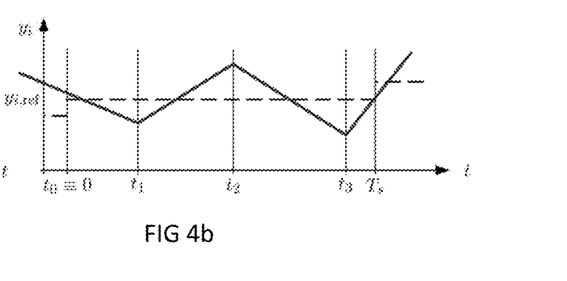

For example, consider a two-level inverter with the three-phase switch position $u_{abc} \in \{-1, 1\}^3$. As depicted in FIG. 4a, assume that $u_{abc}(t_0^-) = [1 \ 1 \ 1]^T$ was applied at the end of the previous sampling interval. In the current sampling interval, the converter switches at the time instants $t_1$, $t_2$ and $t_3$ to the switch positions $u_{abc}(t_1) = [-1 \ 1 \ 1]^T$, $u_{abc}(t_2) = [-1 \ 1 \ 1]^T$ and $u_{abc}(t_3) = [-1 \ -1 \ -1]^T$, respectively. In doing so, the evolution of the output variables is controlled. In FIG. 4b the evolution of only one of the controlled variables $y_i$, with $i \in \{1, \ldots, n_y\}$, is shown in the continuous-time domain along with the corresponding reference. FIGS. 4a and 4b provide an example of one candidate switching sequence and the corresponding switching instants (see FIG. 4a) as well as its effect on one of the output variables (FIG. 4b).

Figure 5:
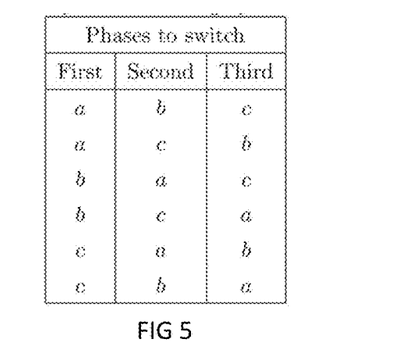
FIG. 5 shows a table with possible orders in which the phases switch in a two-level converter.

The switching instants divide the interval [0, $T_s$) in (3) into the four subintervals [0, $t_1$), [$t_1$, $t_2$), [$t_2$, $t_3$), and [$t_4$, $T_s$). The three phases can switch in six different chronological orders, as summarized in Table 1 of FIG. 5.

To better understand this concept, the following example is provided. For $u_{abc}(t_0) = u_{abc}(t_0^-) = [1 \ 1 \ 1]^T$ and the phase sequence a→b→c, the sequence of the to-be-applied three-phase switch positions is:

$$u_{abc}(t_0) = [1 \ 1 \ 1]^T, t_0 \leq t < t_1$$

$$u_{abc}(t_1) = [-1 \ 1 \ 1]^T, t_1 \leq t < t_2$$

$$u_{abc}(t_2) = [-1 \ -1 \ 1]^T, t_2 \leq t < t_3$$

$$u_{abc}(t_3) = [-1 \ -1 \ -1]^T, t_3 \leq t < T_s$$

For the phase sequence a→c→b, which is shown in FIG. 4a, the switching sequence becomes $$u_{abc}(t_0) = [1 \ 1 \ 1]^T, t_0 \leq t < t_1$$

$$u_{abc}(t_1) = [-1 \ 1 \ 1]^T, t_1 \leq t < t_2$$

$$u_{abc}(t_2) = [-1 \ 1 \ -1]^T, t_2 \leq t < t_3$$

$$u_{abc}(t_3) = [-1 \ -1 \ -1]^T, t_3 \leq t < T_s$$

The same logic applies to the remaining four combinations.

In the method of the disclosure it is assumed that the controlled variables evolve linearly within one sampling interval $T_s$ with constant gradients (or slopes). These gradients are assumed to be the same throughout the sampling interval. This simplification is valid since $T_s \ll T_1$, where $T_1$ is the fundamental period. In other words, the controlled variables, such as currents or voltages, change in a linear manner within a short period of time and the sampling frequency is much higher than the fundamental frequency of the controlled variables, e.g., currents or voltage. To further simplify the calculation, the reference values of the controlled variables are considered constant over the sampling interval. However, this assumption could be relaxed, as will be explained later.

With the above assumptions, the evolution of the output variables within the four subintervals can be described by their corresponding gradients $$m = \frac{dy}{dt} \in R^{n_y}$$

as follows:

1. $t_0 \leq t < t_1$: At the beginning of the sampling interval ($t_0=0$) the three-phase switch position applied in the previous sampling interval is still being applied, i.e., $u_{abc}(t_0) = u_{abc}(t_0^-)$. Consequently, the controlled variables evolve with the (vector-valued) gradient $$m(t_0) = \frac{dy(t_0)}{dt} = C \frac{dx(t_0)}{dt} = C(Dx(t_0) + Eu_{abc}(t_0)) \quad (5)$$

2. $t_1 \leq t < t_2$: At time instant $t_1$ a new three-phase switch position $u_{abc}(t_1)$ is applied that allows for one commutation in one of the three phases, i.e., $\|u_{abc}(t_1) - u_{abc}(t_0)\|_1 = 2$. As a result, the controlled variables evolve with the gradient $$m(t_1) = C(Dx(t_0) + Eu_{abc}(t_1)). \quad (6)$$

Note that the gradient at time instant $t_1$ depends on the state at time instant $t_0$ (rather than at $t_1$) because of the assumption made above that the gradients are constant within the sampling interval.

3. $t_2 \leq t < t_3$: At time instant $t_2$ the three-phase switch position $u_{abc}(t_2)$ is applied that allows for one commutation in one of the remaining two phases, $\|u_{abc}(t_2) - u_{abc}(t_1)\|_1 = 2$ and $\|u_{abc}(t_2) - u_{abc}(t_0)\|_1 = 4$. The controlled variables evolve with the gradient $$m(t_2) = C(Dx(t_0) + Eu_{abc}(t_2)). \quad (7)$$

4. $t_3 \leq t < T_x$: For the last interval, the switch position $u_{abc}(t_3)$ is applied that implies one commutation in the last phase that has been inactive thus far, i.e., $\|u_{abc}(t_3) - u_{abc}(t_2)\|_1 = 2$ and $\|u_{abc}(t_3) - u_{abc}(t_0)\|_1 = 6$. The controlled variables evolve with the gradient $$m(t_3) = C(Dx(t_0) + Eu_{abc}(t_3)). \quad (8)$$

To simplify the optimization procedure, we apply the prior assumptions. Moreover, a fairly coarse, yet effective, approximation of the rms error is performed. Specifically, the deviation of the controlled variables from their references is penalized only at the time instants $t_1$, $t_2$, $t_3$ and $T_s$. This approximation can be further improved as will be outlined below.

In light of these simplifications, we rewrite the objective function (3) as $$J = \|y_{ref} - y(t_1)\|_Q^2 + \|y_{ref} - y(t_2)\|_Q^2 + \|y_{ref} - y(t_3)\|_Q^2 + \|y_{ref} - y(T_s)\|_Q^2, \quad (9)$$

where $y_{ref} = y_{ref}(t_0)$, i.e., the reference value stays constant during the whole sampling interval as explained above. Utilizing (5)-(8), and after some algebraic manipulations, it can be shown that function (9) in vector form becomes $$J = \left\| \begin{bmatrix} y_{ref} - y(t_1) \\ y_{ref} - y(t_2) \\ y_{ref} - y(t_3) \\ y_{ref} - y(T_s) \end{bmatrix} \right\|_{\tilde{Q}}^2 = \left\| \underbrace{\begin{bmatrix} y_{ref} - y(t_0) \\ y_{ref} - y(t_0) \\ y_{ref} - y(t_0) \\ y_{ref} - y(t_0) - m(t_3)T_s \end{bmatrix}}_{r} - \right. \quad (10)$$

$$\left. \underbrace{\begin{bmatrix} m(t_0) & 0 & 0 \\ m(t_0) - m(t_1) & m(t_1) & 0 \\ m(t_0) - m(t_1) & m(t_1) - m(t_2) & m(t_2) \\ m(t_0) - m(t_1) & m(t_1) - m(t_2) & m(t_2) - m(t_3) \end{bmatrix}}_{M} \underbrace{\begin{bmatrix} t_1 \\ t_2 \\ t_3 \end{bmatrix}}_{t} \right\|_{\tilde{Q}}^2$$

$$\| r - Mt \|_{\tilde{Q}}^2$$

where $$\tilde{Q} = \underbrace{\mathrm{diag}(Q, \ldots, Q)}_{n_y \text{ times}},$$

and 0 is the $n_y$-dimensional zero vector.

Hereafter, the steps of the disclosed method are summarized. Assume that the previously applied switch position is $u_{abc}(t_0^-) = [1\ 1\ 1]^T$. This implies that the three phases switch from 1 to −1 within the sampling interval $T_s$. The switch position at the end of the interval is thus $u_{abc}(t_3) = [-1\ 1\ 1]^T$. As explained before, six different switching sequences exist, as summarized in Table 1. Conversely, in case of $u_{abc}(t_0^-) = [-1\ -1\ -1]^T$, each phase switches from −1 to 1. The final three-phase switch position is then $u_{abc}(t_3) = [1\ 1\ 1]^T$. Again, six different switching sequences exist.

In the method of the disclosure, the possible gradients that depend on the measured and/or estimated state vector $x(t_0)$ and the possible switch positions $u_{abc}$ of the power converter are computed. In the case of a two-level converter, eight switch positions $u_{abc}$ yield seven different voltage vectors in the $\alpha\beta$-plane, which result in the seven unique output vector gradients $m_z$, with $z \in \{0, 1, 2, \ldots, 6\}$. To compute these gradients, equation (5) is rewritten as $$m_z = C(Dx(t_0) + Eu_z), \quad (11)$$

where $u_z$ refers to the seven different switch positions in the $\alpha\beta$-plane.

Following, depending on the previously applied switch position $u_{abc}(t_0^-)$, the corresponding six switching sequences $U_z$, $z \in \{1, 2, \ldots, 6\}$ are determined. As previously described, the six possible switching sequences come from the fact that the switch position of each phase is changed once in each sampling interval. As stated before, this implies that for a three-phase system, there are six possible orders in which the switches can be controlled such that each switch pair is controlled once.

In the disclosure, each switching sequence is considered and a dedicated optimization problem is solved for each switching sequence. With the simplified objective function (10), this optimization problem takes the form $$\underset{t}{\text{minimize}} \ \| r - Mt \|_{\tilde{Q}}^2 \quad (12)$$

subject to $0 < t_1 < t_2 < t_3 < T_s$, $t \in R^3$

Problem (12) is a convex quadratic program (QP). Its solution, the so called optimizer, is the vector of switching instants t. Solving the QP for each one of the six switching sequences $U_z$, $z \in \{1, 2, \ldots, 6\}$, leads to the six triplets of switching instants $t_z$, switching sequences $U_z$ and values of the objective function $J_z$, with $z \in \{1, 2, \ldots, 6\}$.

Further in the method, the triplet with the minimal value of the objective function is chosen. More specifically, the trivial optimization problem $$\underset{z}{\text{minimize}} \ J_z \quad (13)$$

is solved to determine the optimal triplet of switching instants $t^*$, switching sequence $U^*$ and value of the objective function $J^*$, such that $J(U^*, t^*) = J^*$. The former two quantities are defined in accordance with (4) as $$t^* = [t^*_1\ t^*_2\ t^*_3]^T \quad (14a)$$

$$U^* = [u^*_{abc}{}^T(t_0)\ u^*_{abc}{}^T(t_1)\ u^*_{abc}{}^T(t_2)\ u^*_{abc}{}^T(t_3)]^T \quad (14b)$$

The resulting optimal switching sequence is applied with the appropriate switching times to the converter.

Thus in the invention, possible switching sequences and switching instants are computed by minimizing the control error; the switching sequence that results in the smallest error is chosen as optimal and applied at the corresponding optimal switching instants to the converter. The acquisition of the optimal switching sequence and instants is done in one stage by solving an optimization problem in real time. Thus, the controller combines the control and modulation of the converter in one computational stage.

The invention can be summarized with the following steps, which have already been described above in detail. First, the possible gradient vectors are computed $m_z$, $z \in \{0, 1, \ldots, 6\}$ and possible switching sequences are enumerated $U_z$, $z \in \{1, 2, \ldots, 6\}$, starting from $u_{abc}(t_0^-)$, on the basis that each phase switches once within the sampling interval.

For each switching sequence $U_z$, solving the QP (equation (12)) yields $t_z$ and $J_z$. The optimal time instants $t^*$ and the selected switching sequence $U^*$ are determined by solving the trivial optimization problem shown in equation (13).

Figure 2:
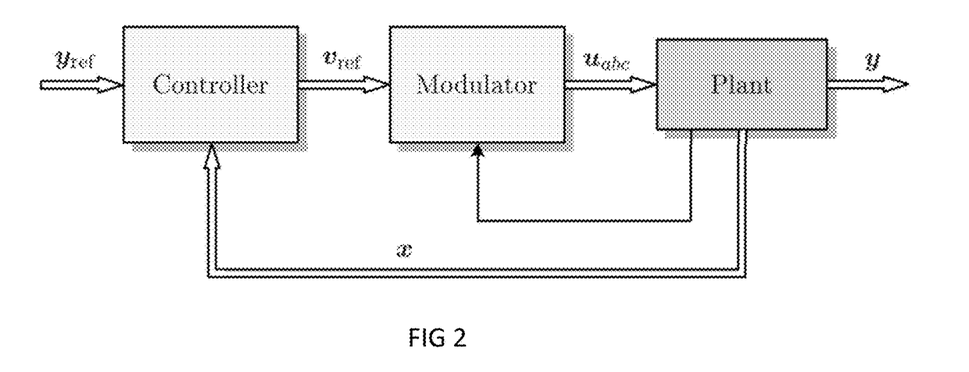
FIG. 2 shows a block diagram of indirect control.
Figure 3:
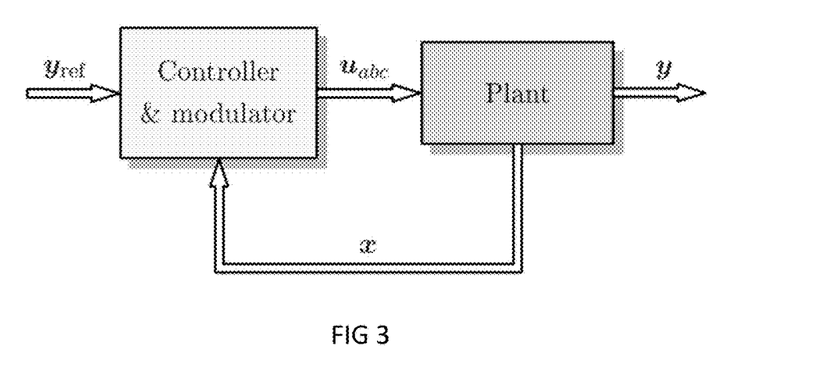
FIG. 3 shows a block diagram of direct control.

FIGS. 2 and 3 show the basic block diagrams of indirect control (FIG. 2) and direct control (FIG. 3). In direct control, such as in the control method of the invention, the controller regulates the system output y along its reference $y_{ref}$ by directly manipulating the system input $u_{abc}$, i.e., the three-phase switch positions. In indirect control, the controller regulates the system output y along its reference $y_{ref}$ by manipulating the modulating signal $v_{ref}$. A modulation stage is required to translate the modulating signal $v_{ref}$ into three-phase switch positions.

Figure 6:
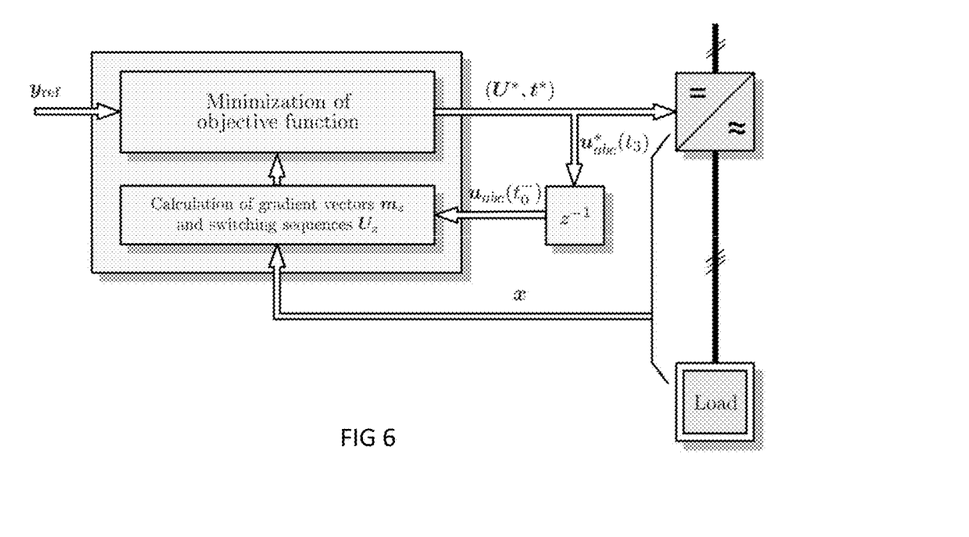
FIG. 6 shows a simplified block diagram of the system relating to the invention.

FIG. 6 shows an example of a block diagram of the present disclosure. In this figure, the converter is shown to control a load, which can be, for example, an induction motor. The converter is shown to receive the vector of reference values $y_{ref}$ and the state x is received from the electrical system. Furthermore, the previously applied three-phase switch position is received. Based on these data, the gradients are calculated for each of the possible control inputs (i.e., switch positions) and the objective function is minimized. The optimal switching sequence is applied to the switches of the converter at the corresponding optimal switching instants.

In order to further improve the performance of the direct MPC scheme, several refinements and extensions can be implemented. According to an embodiment, to better approximate the rms error, rather than penalizing the squared deviation of the controlled variables from their reference values at time instants $t_1$, $t_2$, $t_3$ and $T_s$, additional samples can be added. To this end, one sample in the middle of each of the four intervals can be added at the time instants $$\left\{ \frac{t_1}{2}, \frac{t_1+t_2}{2}, \frac{t_2+t_3}{2}, \frac{t_3+T_s}{2} \right\} \quad (15)$$

Figure 7A:
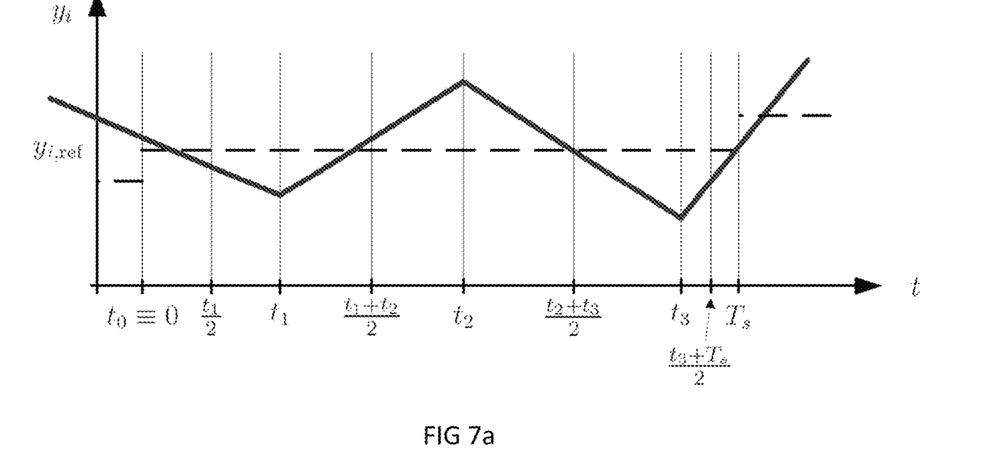
FIG. 7a shows a controlled variable together with a reference value corresponding to FIG. 7b with additional intermediate samples.
Figure 7B:
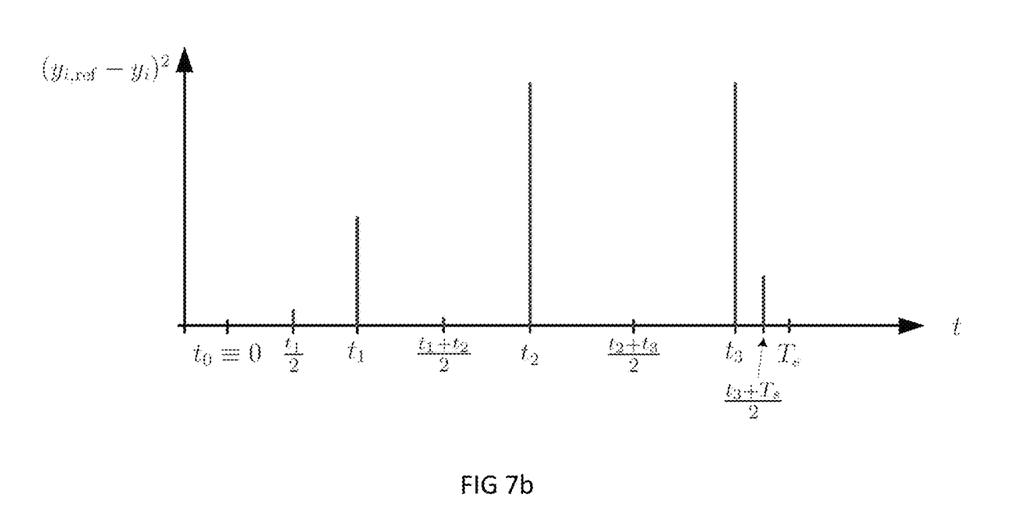

This is shown in FIG. 7a. By doing so, the number of samples is doubled from 4 to 8, thus improving the accuracy of the rms error approximation. This eight-sample approach addresses one particular issue of the four-sample approach, which is unable to distinguish whether or not the squared error has a zero transition between two consecutive time instants of the switching sequence. In case of a zero transition, say between $t_1$ and $t_2$, the rms error is small, as indicated in FIG. 7a. Without such a zero transition, however, the rms error tends to be large, which cannot be captured by the samples at $t_1$ and $t_2$. Adding an intermediate sample resolves this issue by enabling the objective function to distinguish between the two cases.

With the four intermediate sampling instants (15), the objective function (10) takes the form $$J = \left\| \begin{array}{c} y_{ref} - y\left(\frac{t_1}{2}\right) \\ y_{ref} - y(t_1) \\ y_{ref} - y\left(\frac{t_1+t_2}{2}\right) \\ y_{ref} - y(t_2) \\ y_{ref} - y\left(\frac{t_2+t_3}{2}\right) \\ y_{ref} - y(t_3) \\ y_{ref} - y\left(\frac{t_3+T_s}{2}\right) \\ y_{ref} - y(T_s) \end{array} \right\|_{\tilde{Q}}^2 = \left\| \underbrace{\begin{array}{c} y_{ref} - y(t_0) \\ y_{ref} - y(t_0) \\ y_{ref} - y(t_0) \\ y_{ref} - y(t_0) \\ y_{ref} - y(t_0) \\ y_{ref} - y(t_0) \\ y_{ref} - y(t_0) - \frac{m(t_2)}{2} T_s \\ y_{ref} - y(t_0) - m(t_3) T_s \end{array}}_{r} - \right.$$

$$\underbrace{\begin{bmatrix} \frac{m(t_0)}{2} & 0 & 0 \\ m(t_0) & 0 & 0 \\ m(t_0) - \frac{m(t_1)}{2} & \frac{m(t_1)}{2} & 0 \\ m(t_0) - m(t_1) & m(t_1) & 0 \\ m(t_0) - m(t_1) & m(t_1) - \frac{m(t_2)}{2} & \frac{m(t_2)}{2} \\ m(t_0) - m(t_1) & m(t_1) - m(t_2) & m(t_2) \\ m(t_0) - m(t_1) & m(t_1) - m(t_2) & m(t_2) - \frac{m(t_3)}{2} \\ m(t_0) - m(t_1) & m(t_1) - m(t_2) & m(t_2) - m(t_3) \end{bmatrix}}_{M} \begin{bmatrix} t_1 \\ t_2 \\ t_3 \end{bmatrix} \right\|_{\tilde{Q}}^2$$

$$= \|r - Mt\|_{\tilde{Q}}^2.$$

The dimension of the optimizer (the vector of switching instants t) remains unchanged, but the dimension of the optimization matrices doubles. Therefore, the complexity of the optimization problem remains almost the same, but the approximation of the rms error is significantly improved.

It is evident that even more additional intermediate samples can be added to further improve the accuracy of the rms error approximation. Thus according to the embodiment, the number of samples used in the calculation of the error is increased since it is calculated at additional time instants between the switching time instants.

According to another embodiment, rather than considering constant references for the controlled variables throughout the sampling interval, i.e., $y_{ref}(t)\ y_{ref}(k)$, for $t \in [0,T_s)$, the references of the controlled variables can be computed by predicting their values at the next time step k+1 and by linearly interpolating between the is time steps k and k+1. Given that the references are typically sinusoidally varying quantities during steady-state operation, this approach leads to a smaller tracking error. According to the embodiment, the value of the reference is assumed to change linearly. The prediction can be accomplished, for example, by predicting the references at the next time step k+1 and by linearly interpolating between the time steps k and k+1. The evolution of the references is then given by $$y_{ref}(t) = y_{ref}(kT_s) + \frac{y_{ref}((k+1)T_s) - y_{ref}(kT_s)}{T_s} t \quad (16)$$

Figure 8:
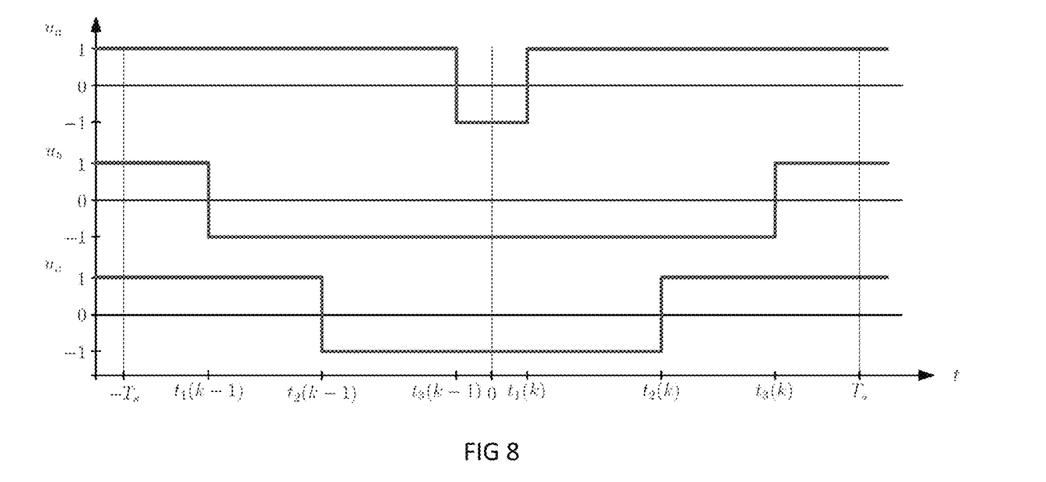
FIG. 8 shows a switching sequence when penalizing changes in the per-phase switching instants between two consecutive sampling intervals.

To reduce the differences between two consecutive switching instants in the same phase—thus enhancing the symmetry of the switching pattern and providing a certain degree of damping to the controller actions—a penalty on their changes can be added. In this embodiment, in addition to the tracking error, i.e., the error between the references and the predicted controlled variables, changes in the optimization variable, i.e., the switching instants, are penalized in the optimization problem. Thus, in deciding which switching sequence and switching instants to use, the procedure aims to achieve a certain degree of symmetry in the consecutive switching patterns. The above can be taken into account by utilizing the previously derived switching instants and by penalizing with a certain weight $\lambda$ the changes between two consecutive vectors of the switching instants (FIG. 8). To this end, a control effort term is added to the optimization problem of equation (12), which takes the form $$\underset{t}{\text{minimize}}\ \|r - Mt\|_{\tilde{Q}}^2 + \lambda \|\Delta t\|_2^2$$

subject to $0 < t_1 < t_2 < t_3 < T_s, t \in R^3$

This embodiment does not affect the size of the optimizer and it will remain three-dimensional. Thus, the computational complexity of the problem remains the same as for the initial problem.

Figure 9:
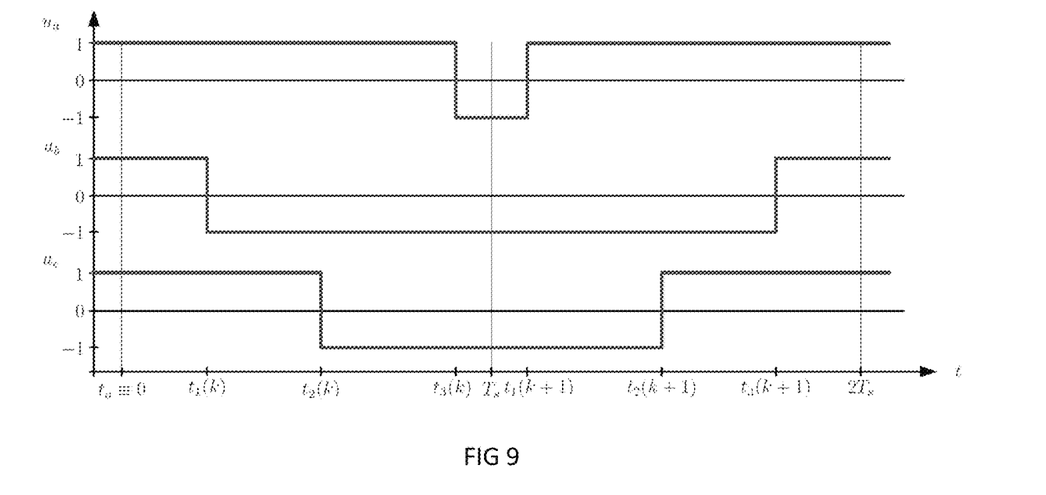
FIG. 9 shows a prediction horizon over two sampling intervals with six switching instants.

Longer prediction horizons enable the controller to make better educated decisions about the future evolution of the controlled system. However, they typically come at the cost of an increased computational complexity. To keep the computational complexity at bay, in an embodiment, each switching sequence is extended by introducing a mirrored (with respect to $T_s$) version of the switching sequence used in the previous interval. The mirrored sequence refers to a sequence in which the switches are used in reverse order with respect to the previous switching sequence. An example of the two consecutive and mirrored switching sequences is provided in FIG. 9.

As a result, in case of a prediction horizon over two sampling intervals, only six unique switching sequences need to be evaluated and six corresponding QPs need to be solved. The dimension of the optimizer of these QPs, however, is now six (rather than three). It is straightforward to extend this approach to even longer prediction horizons without increasing the number of candidate switching sequences, which remains six. The size of the QPs increases linearly with the number of sampling intervals in the prediction horizon.

Figure 10:
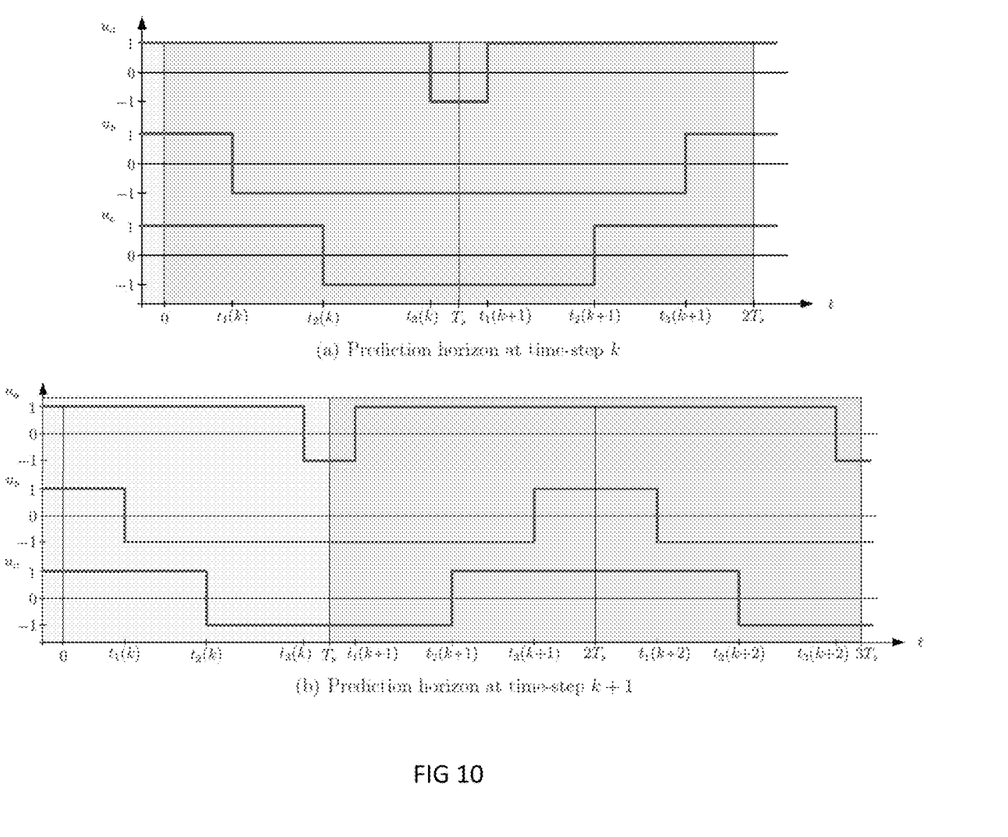
FIG. 10 shows the receding horizon policy for a prediction horizon over two sampling intervals.

When considering prediction horizons over multiple sampling intervals, the controller makes a plan into the future that exceeds the next sampling interval $T_s$. Only the first instance of this plan is implemented, i.e., only the switching sequence with the corresponding switching instants within the first sampling interval is applied to the converter. Once the sampling interval has passed, the plan is recomputed based on new measurements (or estimates) over a prediction horizon that is shifted one sampling interval into the future. This is a typical implementation of the so-called receding horizon policy. The notion of the receding horizon policy is exemplified in FIG. 10. In FIG. 10*a*, the prediction horizon is shown at time-step k, whereas FIG. 10*b* shows the prediction horizon at time-step k+1. Note that, thanks to the receding horizon policy, feedback is provided every sampling interval, making the MPC scheme robust to modelling mismatches, parameter uncertainties and disturbances.

Figure 11:
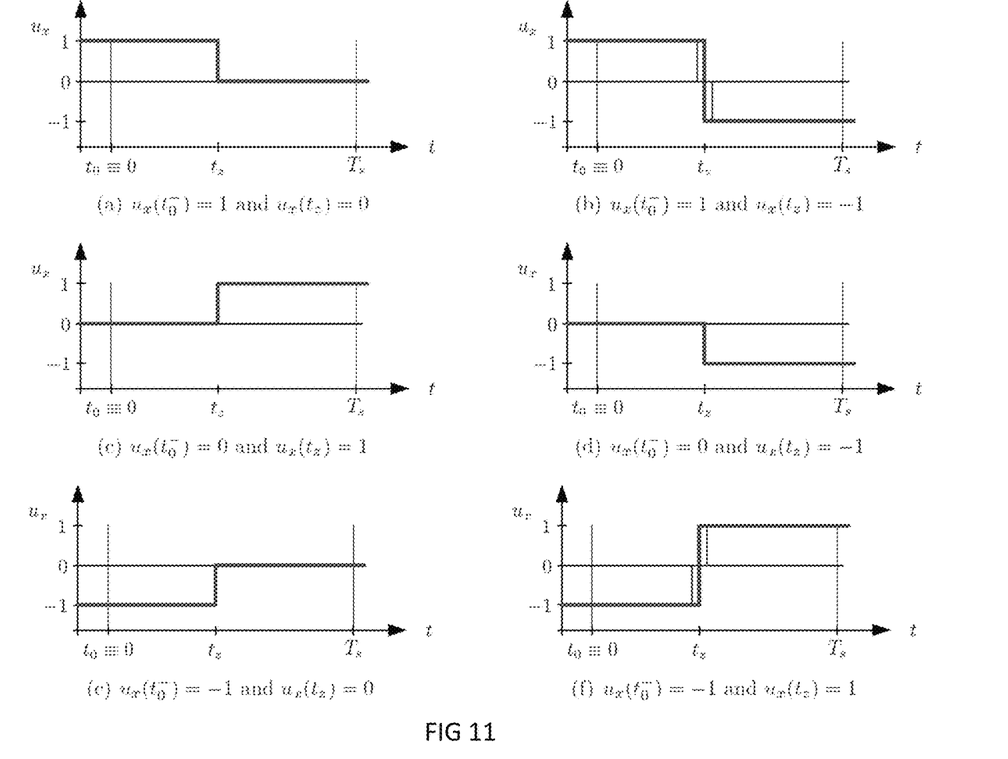
FIG. 11 shows possible switching transitions in one phase of a three-level converter.

In the above description of the invention, two-level converters were considered. Three-level converters, however, can switch in each phase to two new switch positions $u_x(t_z)$, for $t_z < T_s$ with $z \in \{1, 2, 3\}$. As a result, two different switching transitions are possible per phase as shown in FIG. 11, resulting in $2^3 = 8$ different switch positions at the end of the sampling interval. As there are six possible sequences with which the three phases can switch, 6·8=48 switching sequences need to be explored and 48 QPs are to be solved for a three-level inverter.

Figure 12:
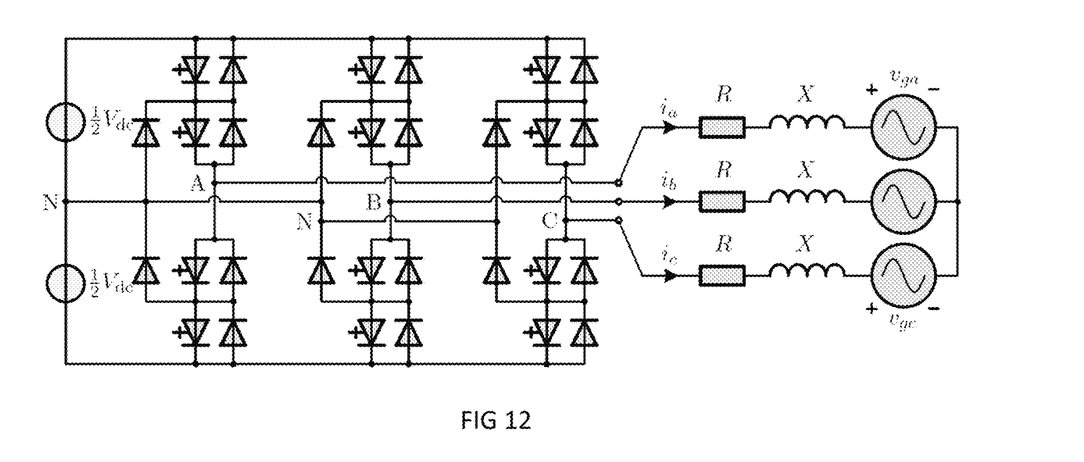
FIG. 12 shows a neutral point clamped three-level voltage source converter connected to an active RL load, such as an AC grid.
Figure 13:
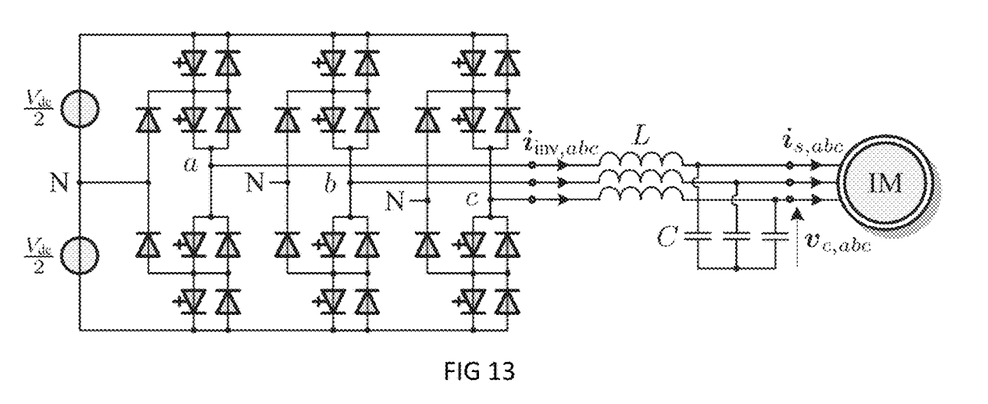
FIG. 13 shows a neutral point clamped three-level voltage source inverter connected via an LC filter to an induction machine.

To reduce the computational complexity of the optimization problem, however, the final switch position $u_x(t_z)$ can be found in each phase by considering the per-phase average switch position $ũ_x \in R$. The latter can be computed analytically as the (ideal and real-valued) modulation index, which an indirect controller would compute and send to the PWM stage. Utilizing $ũ_x$, it can be shown that only six switching sequences need to be explored and six QPs need to be solved. Therefore, the computational complexity of the proposed direct MPC scheme is the same for two-level and for three-level converters. The concept can be extended in a straightforward manner to multilevel converters (FIGS. 12 and 13).

In the converter of the present invention, the above-described method is implemented. The converter comprises semiconductor switches, which can switch a voltage to the corresponding outputs. For each phase, a pair of switches is employed in a two-level converter. In multilevel converters, the number of used switches depends on the used topology. Further, the output of the converter is connected to an electrical system or device. The output may be connected to an AC grid or power network or to a general AC load or to a rotating electrical machine for controlling the currents, electromagnetic torque, flux and rotational speed of the machine.

The converter comprises further memory for storing a mathematical representation of the converter and the electrical system to which the converter is connected. Further, the converter of the invention comprises calculation means for carrying out the various steps of the method, in which the modulation sequence is determined. The calculation means may be a processor of the converter, which is programmed to carry out the method. Converters typically comprise processing capacity, which can access a memory. The processing capacity is employed for solving the optimization problem described above. It is to be noted that a modulator is not needed in the converter according to the invention. That is to say that the calculations are carried out in the converter in real time prior to each modulation or sampling interval. The calculations predict the behaviour of the system in an accurate manner, and during the sampling interval additional comparisons between the reference values and the actual values are not required. Thus the conventional control loop with the modulator is not required to achieve a fast control and modulation.

It will be obvious to a person skilled in the art that, as the technology advances, the inventive concept can be implemented in various ways. The invention and its embodiments are not limited to the examples described above but may vary within the scope of the claims.

The invention claimed is:

1. A method of controlling and modulating a converter connected to an electrical system, the converter comprising controllable switches to form discrete output voltages, wherein the method comprises:
    forming, with a controller of the converter, a mathematical representation of the electrical system comprising the converter,
    receiving, with the controller, reference values for controlled variables,
    calculating, with the controller, gradients of controlled variables based on the mathematical representation of the electrical system,
    determining, with the controller, possible switching sequences in a modulation period, a switching sequence defining an order in which the controllable switches are switched,
    for each possible switching sequence, minimizing, with the controller, an error between the provided references and the corresponding controlled variables based on the calculated gradients by optimizing switching time instants of the switching sequence,
    selecting, with the controller, the switching sequence with a smallest error, and
    applying, with the controller, the switching sequence with corresponding switching times in the modulation period to modulate the controllable switches.

2. The method according to claim 1, wherein calculating gradients comprises calculating a gradient for each possible switch combination.

3. The method according to claim 2, wherein the switching sequence over the modulation period has one turn-on switching transition and one turn-off switching transition per phase.

4. The method according to claim 2, wherein the controlled variables are measured or estimated.

5. The method according to claim 2, wherein the controlled variables are output currents of the converter.

6. The method according to claim 2, wherein the minimization of the error between the provided references and the corresponding controlled variables comprises solving a convex quadratic programming problem, and a solution to the problem produces switching time instants in the modulation period.

7. The method according to claim 1, wherein the switching sequence over the modulation period has one turn-on switching transition and one turn-off switching transition per phase.

8. The method according to claim 7, wherein the controlled variables are measured or estimated.

9. The method according to claim 1, wherein the controlled variables are measured or estimated.

10. The method according to claim 1, wherein the controlled variables are output currents of the converter.

11. The method according to claim 1, wherein the minimization of the error between the provided references and the corresponding controlled variables comprises solving a convex quadratic programming problem, and a solution to the problem produces switching time instants in the modulation period.

12. The method according to claim 1, wherein the reference values for the controlled variables are of constant values for the duration of the modulation period.

13. The method according to claim 1, wherein the reference values for the controlled variables are linearly changing values in the modulation period.

14. The method according to claim 1, wherein in two consecutive switching periods the controllable switches are modulated in reverse order.

15. The method according to claim 1, wherein the error between the provided references and the corresponding controlled variables is calculated at the switching instants of the controllable switches.

16. The method according to claim 1, wherein the error between the provided references and the corresponding controlled variables is calculated at the switching instants of the switches and between the consecutive switching instants.

17. The method according to claim 1, wherein the step of minimizing the error comprises
determining changes in the switching time instants form previous corresponding switching time instants, and
penalizing the changes in the switching time instants in an optimization problem.

18. The method according to claim 1, wherein the method comprises
considering multiple modulation periods in an optimization problem, and
applying only the switching transitions in a first modulation period to the converter according to a receding horizon policy.

19. The method according to claim 1, wherein the converter is a multilevel converter and multiple switching transitions are considered per phase.

20. A converter connected to an electrical system, the converter comprising controllable switches to form discrete output voltages, wherein the converter further comprises:
a controller including a memory and a processor, the controller being structured to:
form a mathematical representation of the electrical system comprising the converter,
receive reference values for controlled variables,
calculate gradients of the controlled variables based on the mathematical representation of the electrical system,
determine possible switching sequences in a modulation period, a switching sequence defining an order in which the controllable switches are switched,
for each possible switching sequence, minimize an error between the provided references and the corresponding controlled variables based on the calculated gradients by optimizing switching time instants of the switching sequence,
select the switching sequence with a smallest error, and
apply the switching sequence with corresponding switching times in the modulation period to modulate the controllable switches.

* * * * *